United States Patent
Stolle et al.

(10) Patent No.: US 6,477,936 B2
(45) Date of Patent: Nov. 12, 2002

(54) ACTUATION ARRANGEMENT FOR DISPLACEABLE COMPONENTS ON VEHICLES

(75) Inventors: Klaus Stolle, Schwabniederhofen (DE); Gerhard Huber, Frankenhofen (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/783,137

(22) Filed: Feb. 15, 2001

(65) Prior Publication Data

US 2001/0015128 A1 Aug. 23, 2001

(30) Foreign Application Priority Data

Feb. 17, 2000 (AT) ............................................. 243/2000

(51) Int. Cl.$^7$ ................................................ F15B 11/08
(52) U.S. Cl. ............................................ 91/436; 91/165
(58) Field of Search ........................ 91/436, 165, 166; 60/403, 468, 406

(56) References Cited

U.S. PATENT DOCUMENTS

| 3,759,144 A | * | 9/1973 | Ikeda ............................ 91/436 |
| 5,065,664 A | * | 11/1991 | Ohta et al. ..................... 91/436 |
| 5,791,226 A | * | 8/1998 | Chung et al. .................. 91/436 |

* cited by examiner

Primary Examiner—Edward K. Look
Assistant Examiner—Thomas E. Lazo
(74) Attorney, Agent, or Firm—Dykema Gossett PLLC

(57) ABSTRACT

An actuation arrangement for displaced components on vehicles, particularly trunk lids, convertible tops, engine hoods or the like, includes at least one supply line for the pressurized medium and one essentially non-pressure connection line to a reservoir for the working medium or a pump arrangement being functionally of the same kind, at least one preferably hydraulic working cylinder, and at least one control valve controlling the supply of a working medium in at least one working chamber of the working cylinder. To make possible a hydraulic movement of the vehicle component as well as a purely manual actuation in any direction without detrimental influence to a subsequent actuation or other measures, except for the on- and off switching of the energy supply of the hydraulic system, the control valve (4) may be electrically operated, at least one of the working chambers of at least one working cylinder (1) may be connected alternatively via a control valve (4) with a supply line (2), or the working chamber may be connected to a connection line while being without electric power, and that an overflow line (7) is provided between the working chambers of the working cylinders (1) whereby the overflow line (7) allows counter-movements of the displaced component, and whereby an open non-energized valve (8) is inserted in the overflow line (7).

12 Claims, 1 Drawing Sheet

ACTUATION ARRANGEMENT FOR
DISPLACEABLE COMPONENTS ON
VEHICLES

BACKGROUND OF THE INVENTION

1. Field of the Invention

The invention relates to an actuation arrangement for displaceable components on vehicles, particularly trunk lids, convertible tops, engine hoods or the like, including at least one supply line for the pressurized medium and one essentially non-pressure connection line to a reservoir for the working medium or a pump arrangement being functionally of the same kind, at least one preferably hydraulic working cylinder, and at least one control valve controlling the supply of a working medium in at least one working chamber of the working cylinder.

2. The Prior Art

For actuation of movable vehicle components, especially hinged vehicle components, there are traditionally hydraulic working cylinder employed, which are joined at one end to the body of the vehicle and at the other end they engage the component to be moved—mostly with the outer end of a piston rod. This solution is applied not only for trunk lids, engine hoods and the cover of convertible tops, but also for sections of convertible tops themselves that are foldable against one another, particularly in case of hardtops or similar constructions. Many precautions have been met thereby so that, for example, during malfunctioning of the hydraulic system, manual emergency actuation of the displaced component is possible in the closing direction, and in case of hydraulic actuation an emergency-stop function is realized, whereby there can be avoided to the greatest extent injuries to persons who found their way into the path of moving vehicle components, or damage to items as well to the vehicle itself and so on.

It is the object of the present invention to provide an actuation arrangement of the noted type which makes possible in a way hydraulic movement of a vehicle component as well as a purely manual actuation in any direction so that subsequent actuations are not influenced detrimentally in any way or that other measures are necessary beside the on- and off-switching of the energy supply for the hydraulic system. As a continuation, there is the added object of further development of an arrangement for realization of a holding function for the displaced vehicle component in case of malfunctioning of the hydraulic system and/or unintended manual actuation.

SUMMARY OF THE INVENTION

The first object is achieved according to the present invention whereby the control valve may be electrically operated, at least one of the working chambers of at least one working cylinder may be connected alternatively via the control valve with the supply line, or the working chamber may be connected with a connection line while being without electric power, whereby an overflow line is provided between the working chambers of the working cylinders which allows for counter-movements of the displaced component, and whereby an open non-energized valve is inserted in the overflow line. Thereby the separation of the working chambers is guaranteed during continuous energy supply, allowing the counter-movement of the displaced vehicle component. The working chambers may be supplied differentially with a pressurized working medium, preferably hydraulic oil, in the conventional manner via a control valve, or possibly also via a respective control valve for each working chamber. If, however, the energy supply to the actuation arrangement malfunctions or is intentionally not put in effect, then the formerly separated working chambers communicate with one another via the overflow line and the now open valve so that forward-pushing of the working medium can take place between the two working chambers. Thereby the unrestricted manual actuation of the vehicle component is also guaranteed—should it be intended or be in the way of an emergency actuation during malfunctioning of the hydraulic system.

According to an especially advantageous embodiment of the actuation arrangement, there is provided at least one double-action working cylinder having a piston-side and a rod-side working chamber to move the component on the vehicle whereby the overflow line interconnects the opposing working chambers of one or each working cylinder. The use of double-action working cylinders offers a favorable version with proven and tested components in terms of space requirements, construction and engineering requirements.

To make possible an especially simple, compact and economic differential control of one or each double-action cylinder based on only one necessary control valve, it is proposed that only the piston-side working chamber of the working cylinder is connected with the supply line via a control valve.

According to an additional characteristic of the invention, it is proposed that a first post-suction line leads from the overflow line to a reservoir for the working medium and in which first post-suction line there is a check valve inserted blocking in the direction of the reservoir. Thereby possible volume differences may be equalized in the interconnected working chambers to push the working medium forward, which is of significance especially in double-action cylinders whereby a difference in volume exists between the piston-side and rod-side working chamber based on the piston rod. Excess (fluid) volume is thereby diverted from the piston-side working chamber to the reservoir via the connection line, whereas the difference in (fluid) volume may be supplemented via a post-suction line from the reservoir during manual outward-pushing of the working cylinder.

When, according to the invention, a pressure relief valve is inserted in the connection line and a check valve is inserted in the overflow line, then there can be guaranteed a restricted, slower and more gentle movement of the vehicle component in its predetermined position as a result of the effective forces—particularly in conjunction with possible throttle elements in the connection line or merely by the resistance in the line. For example, a trunk lid is lowered in this way back into its locked position in a slow and controlled fashion.

In an embodiment, such as described in the preceding paragraph, a holding function in the respectively reached position of the displaced vehicle component may be realized if the threshold value for opening of the pressure relief valve is additionally set in such a manner that in each position of the displaced component, an at least equally large hydraulic force counteracts its weight or closing force. Thereby the threshold value can be automatically adjusted depending on the position of the vehicle or depending on the maximum weight of the displaced component in its most unfavorable position. Only an additional effective force, for example, through manual actuation of the displaced vehicle component, leads then to the opening of the pressure relief valve, after which the movement of the vehicle component continues in the direction of this force and whereby it may be brought preferably into a secure end position and/or locked position.

Supplementary components that possibly assist in the movement in any way are thereby to be considered of course in the calculation of force balance, such as pneumatic springs assisting in the opening movement of the trunk lid or the like.

In the embodiments of the latter described actuation arrangements having at least one double-action cylinder with a piston-side or rod-side working chamber for moving components on a vehicle and an overflow line which interconnects opposing working chambers of one or each working cylinder, there is proposed for achievement of the described effects and advantages that the check valve opens the overflow line leading from the rod-side working chamber to the piston-side working chamber and blocks in the opposite direction.

To make possible, without restriction, the supply of working medium into the working chamber and thereby an enlarged volume, and subsequent actuation methods of any kind and in any direction—even during manual actuation of the displaced vehicle component—a second post-suction line leads from the overflow line to a reservoir for the working medium, according to an additional characteristic of the invention, whereby the second post-suction line starts at the side of the overflow line and is disposed opposite the open non-energized valve and opposite the check valve of the first post-suction line. A check valve is inserted in the second post-suction line blocking in the direction of the reservoir.

If the overflow line is designed with a larger cross section as the remaining connection lines leading from and toward one or each working cylinder, then there is guaranteed in all cases the best unrestricted pushing of the working medium between the working chambers and thereby the easiest manual actuation of the displaced component of the vehicle.

The invention will be better understood by reference to the accompanying drawings taken in conjunction with the following discussion.

DETAILED DESCRIPTION OF THE PREFERRED EMBODIMENTS

Figure 2:
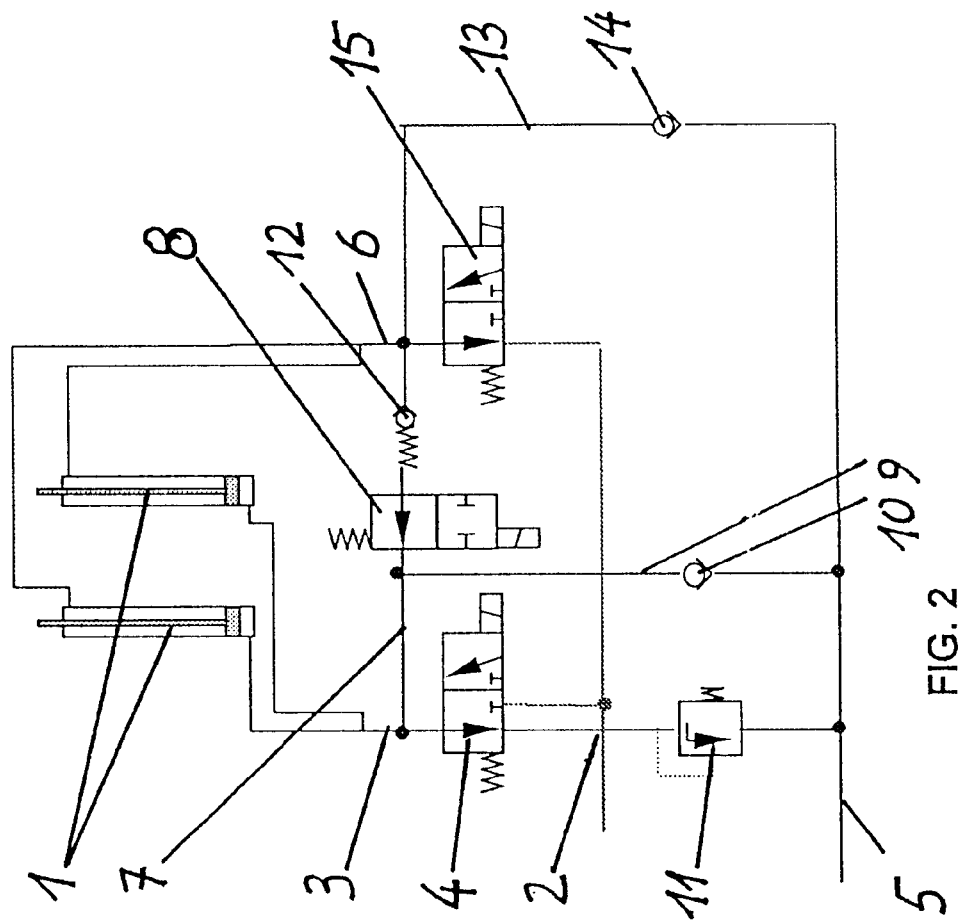
FIG. 2 is a circuit corresponding to that of FIG. 1 but only with direct control of each working chamber via separate control valves.

For example, a trunk lid is to be moved possibly in the opening direction by two double-action cylinders 1 assisted by at least one pneumatic spring. However, as a second function, the trunk lid should be able to be closed or opened manually as well without having electric energy available for the hydraulic system. Moreover, the trunk lid should be able to be kept fixed in any open position against its own weight.

The working cylinders 1 are thereby supplied with pressurized hydraulic oil coming from a supply line 2 through a separate pump unit or through an already existing hydraulic system, for example, for actuation of a convertible top and associated components, such as hinged covers for convertible tops or the like. A branch 3 of the supply line 2 leads to the piston-side working chamber of the working cylinders 1 whereby an electrically operated control valve 4 is provided in the branch 3. The control valve 4 connects under electric power the piston-side working chamber of the working cylinders 1 with the supply line 2 while it connects without electric power the same working chamber with a connection line 5 to a reservoir for the working medium—which means, also during failure or intentional blocking of the energy supply of the actuation arrangement. The rod-side working chambers of the working cylinders are always connected with the supply line 2 via a second branch 6 so that a differentiated inward and outward movement of the working cylinder 1 occurs via the control valve 4, depending on the influence of the pressurized working medium on the rod-side working chamber.

In overflow line 7 is provided between the two branches 3 and 6 of the (hydraulic) line system and therefore also between the piston-side and rod-side working chambers of the working cylinders 1. A valve 8 is disposed in the overflow line 7, which valve is also electrically operated and blocks the overflow line 7 when energized. Thereby the above-mentioned differential control of the working cylinders 1 is guaranteed. However, in the non-energized position, the piston-side and rod-side working chambers of the working cylinders 1 are connected with one another and the hydraulic oil may be pushed freely between the working chambers. To hinder the pushing (of fluid) as little as possible, the overflow line 7 is designed with having the largest possible cross section, a cross section that is in each case larger than the ones in the remaining line segments of the actuation arrangement.

To be able to compensate for the difference of volume in the piston-side working chamber and the rod side- working chamber during hydraulic actuation and also during the forward-pushing of the working medium in manual actuation of the displaced vehicle component, a first post-suction line 9 is provided leading from the overflow line 7 to the connection line 5 and to the reservoir whereby a check valve 10 is inserted into the first post-suction line 9 blocking in the direction of the reservoir.

A holding function for the displaced component can be achieved during failure, manual actuation or intended shutdown of the actuation arrangement in an intermediate position of the displaced vehicle component with the aid of the pressure relief valve 11 disposed between the control valve 4 and the connection line 5 leading to the reservoir in cooperation with the check valve 12 in the overflow line 7. The check valve 12 blocks in the direction from the piston-side working chamber toward the rod-side working chamber, and the pressure relief valve 11 is set to a threshold value that effects a hydraulic counterforce corresponding to the weight of the vehicle component actuated by the working cylinder 1. The hydraulic force for the holding function must be at least equal to the highest existing weight of the displaced component.

The branch 6 of the line system leading to the rod-side working chamber is provided with a second post-suction line 13, having a check valve 14 blocking in the direction of the reservoir to guarantee complete filling of the working chamber also during manual inward-pushing of the working cylinders 1.

The embodiment in FIG. 2 differs from the first example mentioned above only in that there is an electrically operated control valve 15 provided also in the supply line to the rod-side working chambers of the working cylinders 1 from where the second post-suction line 13 branches off between the control valve 15 and the working cylinders 1.

Figure 1:
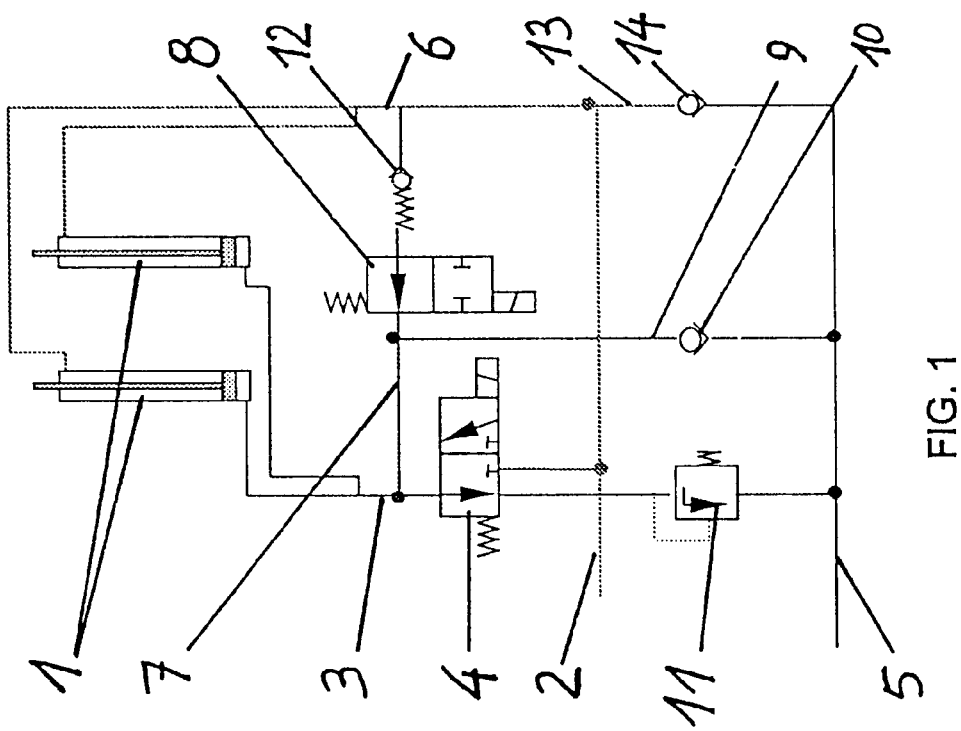
FIG. 1 shows a hydraulic circuit for the actuation arrangement according to the invention having a differential control for the working cylinder.

In the following, the hydraulic function for actuation of a trunk lid with the actuation arrangement is now briefly described in FIG. 1, for example. The cylinders are moved outward to open the trunk lid. During this function, as in the entire hydraulic operation, the valve 8 in the overflow line 7 remains energized and remains closed therefore. The working cylinders 1 are biased by a pressure on the piston side via the control valve 4 and they are moved outward by the effected surface of the piston rod (differential control). The returning oil at the rod side is fed directly to the piston side via the control valve 4 and only the (fluid) volume difference between the piston side and the rod side fed into the working cylinder through the supply line 2.

During inward movement of the working cylinders 1 to close the trunk lid, the control valve 4 is turned off and the pump or the supply line 2 moves the (fluid) volume into the rod side. The dispensed oil from the piston side is pushed into the reservoir or the connection line 5 via the pressure relief valve 11. The valve 8 remains energized and therefore continues to block the overflow line 7.

For manual actuation of the trunk lid, during which no energy is available or is intentionally not made available, the control valve 4 and valve 8 are therefore open.

Should the trunk lid be opened now manually, then the working cylinders 1 are also pulled out by the mechanics of the trunk lid. The rod-side oil is fed back to the piston side by the valve 8 and via the check valve 12. The missing oil, which means the difference in volumes of the piston-side and rod-side working chamber, is re-supplied to the piston side from the reservoir via the check valve 10 and the first post-suction line 9.

Should the trunk lid be stopped or released during the opening process, then the entire load rests on the working cylinders 1. The displaced component remains in the lastly taken position through the pressure relief valve 11, which is set in a manner so that the pressure threshold value for opening the valve corresponds to a hydraulic counterforce relative to the maximum weight of the trunk lid.

During closing, the lid is pushed down by force of hand and thereby a supplemental force is created that surpasses the hydraulic counterforce through the pressure relief valve 11. In this case, the (fluid) volume of the piston side is pushed into the reservoir via the pressure relief valve 11 and the connection line 11. The rod side is refilled via the second post-suction line 13 and the check valve 14. Should the lid be stopped by hand during closing, then the pressure relief valve 11 keeps it also in the respective position.

We claim:

1. An apparatus for controlling movement of a movable component of a vehicle, said apparatus comprising:

a supply line for pressurized working medium, a non-pressurized connection line leading to a reservoir, a hydraulic cylinder attachable to said movable component, said hydraulic cylinder defining first and second working chambers, a first control valve for enabling flow of working medium from said supply line to said first working chamber of said hydraulic cylinder or for enabling flow of working medium from said first chamber to said connection line, an overflow line for connecting said first working chamber with said second working chamber and thereby enabling said hydraulic cylinder to be manually operated, a second control valve in said overflow line, a first post-suction line extending from said overflow line to said connection line, and a first check valve in said first post-suction line for blocking flow of working medium towards said connection line.

2. An apparatus according to claim 1, wherein said hydraulic cylinder includes a cylinder, a piston which is movable within said cylinder, and a rod which extends from said piston out of one end of said cylinder, said piston defining a piston chamber and a rod chamber in said cylinder, said piston chamber comprising said first working chamber and said rod chamber comprising said second working chamber.

3. An apparatus according to claim 1, including a first branch line which extends from said supply line to said first working chamber, and wherein said first control valve is located in said first branch line.

4. An apparatus according to claim 3, including a pressure relief valve in said connection line and a second check valve in said overflow line.

5. An apparatus according to claim 4, wherein said pressure relief valve is adjustable so that a hydraulic force can be created to counter a weight of the movable component at all positions thereof.

6. An apparatus according to claim 4, wherein said second check valve prevents flow of working fluid from said first working chamber to said second working chamber.

7. An apparatus according to claim 4, wherein said second check valve is located in said overflow line between said second control valve and said second working chamber.

8. An apparatus according to claim 7, wherein said first post-suction line is connected at one end to said overflow line between said first working chamber and said second control valve and at an opposite end to said connection line.

9. An apparatus according to claim 4, including a second branch line which extends from said supply line to said second working chamber.

10. An apparatus according to claim 9, including a second post-suction line which extends from said second branch line to said connection line.

11. An apparatus according to claim 10, including a third check valve in said second post-suction line for blocking flow of working medium towards said connection line.

12. An apparatus according to claim 11, wherein said overflow line has a larger cross section for flow of working medium than said supply line, said first branch line, or said connection line.

* * * * *